US012758053B2

(12) United States Patent
Trejo Cermeño et al.

(10) Patent No.: US 12,758,053 B2
(45) Date of Patent: Oct. 13, 2026

(54) FOAMED PRODUCT DISPENSING SYSTEM, PRODUCT CONTAINER, AND PRODUCT DISPENSING METHOD

(71) Applicant: FrieslandCampina Nederland B.V., Amersfoort (NL)

(72) Inventors: Melissa Josefina Trejo Cermeño, Wageningen (NL); Annick Albertine Alfons Dumon, Wageningen (NL); Ericus Johannes Maria Marrée, Wageningen (NL); Mark Robert René Massa, Wageningen (NL); Dirk Jan Bulsink, Wageningen (NL); Wouter Marius Stinesen, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 190 days.

(21) Appl. No.: 18/852,394

(22) PCT Filed: Mar. 23, 2023

(86) PCT No.: PCT/EP2023/057513
§ 371 (c)(1),
(2) Date: Sep. 27, 2024

(87) PCT Pub. No.: WO2023/186705
PCT Pub. Date: Oct. 5, 2023

(65) Prior Publication Data

US 2025/0228405 A1 Jul. 17, 2025

(30) Foreign Application Priority Data

Mar. 28, 2022 (EP) .................................... 22164788

(51) Int. Cl.
*A47J 43/12* (2006.01)
*A23G 9/20* (2006.01)

(52) U.S. Cl.
CPC .............. *A47J 43/128* (2013.01); *A23G 9/20* (2013.01); *A47J 43/123* (2013.01); *A47J 43/126* (2013.01)

(58) Field of Classification Search
CPC ...... A46J 43/123; A46J 43/126; A46J 43/128; A23G 9/20
See application file for complete search history.

(56) References Cited

U.S. PATENT DOCUMENTS 12,274,288 B2 * 4/2025 Innikel .................... B01F 35/42
12,383,094 B2 * 8/2025 Broess ................ A47J 31/4485
2017/0273500 A1 * 9/2017 Botman ............ B01F 23/23121

FOREIGN PATENT DOCUMENTS

WO WO-2016/043590 A1 3/2016
WO WO-2020/204697 A1 10/2020
(Continued)

OTHER PUBLICATIONS

International Search Report and Written Opinion issued in connection with PCT International Patent Application No. PCT/EP2023/057513 dated Aug. 14, 2023 (16 pages).

*Primary Examiner* — Jennifer C Chiang
(74) *Attorney, Agent, or Firm* — Sunit Talapatra; Foley & Lardner LLP

(57) ABSTRACT

A foamed product dispensing system, wherein the system includes: —a product dispensing machine (B), configured to receive an exchangeable product container (H); —a product container (H), configured to cooperate with the product dispensing machine (B), after placement in the machine (B); wherein the product container (H) contains a foamable product (P), preferably a food product, for example cream, wherein the product container (H) has a product processing unit (PPU) including at least one frothing device (15) having a product entrance (15*i*) for receiving product (P) and a product exit (15*u*) for discharging product (P), wherein the
(Continued)

processing unit (PPU) is connectable to a gas supply for supplying gas to the product (P), wherein the product processing unit (PPU) comprises a processing device (7) arranged downstream of the frothing device (15) and configured for performing a mixing treatment and/or pressure reduction treatment of the product provided with gas.

20 Claims, 17 Drawing Sheets

(56) References Cited

FOREIGN PATENT DOCUMENTS

| | | | |
|---|---|---|---|
| WO | WO-2021/172989 | A1 | 9/2021 |
| WO | WO-2021/261994 | A1 | 12/2021 |

* cited by examiner

FOAMED PRODUCT DISPENSING SYSTEM, PRODUCT CONTAINER, AND PRODUCT DISPENSING METHOD

CROSS-REFERENCE TO RELATED APPLICATIONS

This application is a national stage entry of International Application No. PCT/EP2023/057513 filed Mar. 23, 2023, which application claims priority to European Patent Application No. EP22164788.6 filed Mar. 28, 2022. The contents of these applications are herein incorporated by reference in their entirety.

The invention relates to a foamed product dispensing system, wherein the system includes:

- a product dispensing machine, configured to receive an exchangeable product container;
- a product container, configured to cooperate with the product dispensing machine, after placement in the machine;

wherein the product container contains a foamable product, preferably a food product.

WO2016/043590 (P106064) discloses a system for preparing a foamed food product, requiring liquid injection, in particular for for mixing milk concentrate with hot water. The system includes an actuator for rotating a rotatable hot water injector valve between a disabling and an enabling position. The injector valve comprises a first sleeve of Kraiburg TPE Thermolast K TF5STE in which first sleeve annular protrusions of the injector valve are integrally formed. The injector valve further comprises a second sleeve of PP Hopo Eltex P HCW280 supporting and hermetically attached to the first sleeve of TPE. The injector valve actuator is—after connection of a valve containing assembly to a respective product preparation apparatus—in engagement with the rotatable injector valve via said TPE material, whereas the injector valve is preferably biased in the disabling position. The resulting system is relatively complex and bulky, wherein the engagement between the valve and the valve actuator may not be sufficiently reliable during long operational periods that include a large number of valve actuations (for a large number of servings).

Applicant's PCT/NL2021/050585 (non-prepublished) provides an improved foamed product dispensing system, wherein in particular no liquid injection is achieved, and the product to be foamed is preferably cream (e.g. to generate whipped cream). In the known system, a product processing unit (PPU) comprises a processing device arranged downstream of a frothing device, wherein the processing device comprises an undulating, in particular labyrinth type, fluid path for the product provided with gas. In an embodiment, the system includes a valve actuator for operating a valve of a product flow channel that leads to the frothing device. the valve member is formed as a flexible organ with a substantially conical mid-section which can be actuated with respect to a sealed peripheral edge of the valve member by the valve actuator (e.g. in the form of an actuated rod or the-like extending into a socket formed by the conical mid-section). A periphery of the valve member is configured to remain fixedly sealed to a housing of the PPU. In this way product hygiene is maintained at the valve member while flow of product can be well regulated using the valve actuator (which thus does not come into contact with the product). During use, when the valve actuator pushes the valve member upward, the product feedthrough channel is restricted and ultimately closed off. When the valve actuator is subsequently retracted or released, the valve member (at least a mid-section thereof) moves back down. The moving back down of the valve member can e.g. be under influence of pressurized product in the product feedthrough channel, under influence of gravity, under influence of resiliency of the valve member, and/or under influence of frictional contact or the like by the retracting valve actuator. An e.g. annular part of the housing of the is configured to engage a peripheral section of the valve member to inhibit that the flexible valve member moves further down beyond an opened position from the closed position.

The present invention aims to provide an improved foamed product dispensing system. In particular, the invention aims to provide a system that is user-friendly, and reliable over long operational period (e.g. allowing hundreds of servings without a glitch) at optimum hygiene, both during initial storage and transport as well as during use for delivering foamed product.

Moreover, it is desired to provide a system wherein the container can remain hermetically sealed during transport, even in case of relatively rough handling or shaking.

Besides, the invention aims to provide a system can achieve a relatively high throughput, in particularly such that a single serving can be dispensed relatively swiftly.

Also, the invention aims to make this possible using relatively compact means.

Moreover, a goal is to improve system and container manufacturability.

According to a first aspect of the invention, one or more of these objects can be achieved by the features of claim 1.

According to a preferred embodiment there is provided a foamed product dispensing system, wherein the system includes:

- a product dispensing machine, configured to receive an exchangeable product container;
- a product container, configured to cooperate with the product dispensing machine, after placement in the machine;

wherein the product container contains a foamable product, preferably a food product, for example cream;

wherein the product container has a product processing unit that includes at least one frothing device having a product entrance for receiving product and a product exit for discharging product, wherein the processing unit is connectable to a gas supply for supplying gas to the product;

wherein the product processing unit comprises a processing device arranged downstream of the frothing device and configured for performing a mixing treatment and/or pressure reduction treatment of the product provided with gas;

wherein the product processing unit includes a product feedthrough channel upstream of the at least one frothing device, the product feedthrough channel including a valve for controlling product flow towards the frothing device, the valve having a valve seat that is closable by distal section of a respective valve body, the distal section of the valve body carrying a first sealing structure, the valve seat having a substantially cylindrical inner wall for slidingly and sealingly engaging the first sealing structure at at least two different axial closing positions of the valve body (and respective sealing structure) with respect to the valve seat, for example a first closing position and a second closing position that is spaced-apart from the first closing position by at least 1 mm.

In this way, good reliable sealing of the product feedthrough channel can be achieved. In particular, the valve seat and valve body can provide a piston-cylinder type of primary seal, allowing some axial tolerances (such as regarding manufacture and assembly of the PPU, but also due to rough container handing or shaking during transport) without losing an initial sealing state of the channel (such as before initial use of the respective product container).

In particularly, the valve body (carrying respective sealing structure) can hermetically seal the product flow channel at a respective first axial closing position of that valve body and at a different (preferably nearby) second axial closing position of that valve body.

During operation, after placement of the container into the product dispensing machine, the valve seat can preferably be engaged by the valve actuator of the dispensing machine to be drawn back to another (third) axial position (without rotating the valve body) to open the valve and allow product flow. Moreover, during operation, product in the product container may become pressurized by the dispensing machine. Pressurized product in the product feedthrough channel may affect an axial position of the valve body. In that case it is preferred that the valve body can still be held in a respective axial valve closing position by the system (e.g. by the actuator, engaging the valve body), preventing product leaking/discharge when the system is in an idle state (in particular when the system is not activated to discharge foamed product, and the valve actuator—engaging the valve body—is in a valve closing state).

It follows that, for example, the valve body can be axially movable (i.e. linearly, without rotating the valve body with respect to the valve seat) from said closing positions to a third axial position for removing its distal section from the substantially cylindrical inner wall of the valve seat (and thereby removing the respective sealing structure from the cylindrical inner wall), to allow product flow through the valve. Moreover, the valve body can preferably be axially moved (linearly, without rotating the valve body with respect to the valve seat) from its third position back to a respective closing position, to close the valve (and flow channel). Such axial (piston-type) movement can be achieved in a reliable manner by a relatively straightforward actuator movement, and can be provided by a relatively compact valve structure.

Good hermetic sealing (in particular hygienic/aseptic sealing) can be achieved e.g. in case the first sealing structure has a radially expanded section that is elastically compressed by substantially cylindrical inner wall of the valve seat when the valve body is in a said axial closing position. It is preferred that such a first sealing structure can relax, elastically, in case is moved with its valve body to a respective valve opening state.

More preferably, the first sealing structure is uniformingly compressed (radially inwards) by the cylindrical wall when it is located within a sealing space defined by the cylindrical wall, i.e. at each respective closing position of the valve body. Both the cylindrical wall and the first sealing structure can e.g. be circle-symmetrical structures, being concentrically arranged with respect to a central axis of the valve.

According to a further embodiment the first sealing structure can be configured for entirely closing a product flow channel part defined by the substantially cylindrical inner wall of the valve seat, when the valve body is in a said axial closing position. In other words: the first sealing structure as such closes the channel, and for example prevents that product upstream of the first sealing structure contacts the respective valve body. For example, first sealing structure can include a closed top section that axially (and radially) covers the distal section of the valve body. The valve body can e.g. act as a pressure member for pressing/retaining the first sealing structure into the space defined by the cylindrical wall, at each respective valve closing position, the valve body e.g. being located axially behind the first sealing structure, and e.g. protruding towards an environment of the PPU to be engaged by the valve actuator of a said product dispensing machine.

According to a further embodiment, the valve seat includes a radially diverging proximal section, the radially diverging proximal section preferably having an outer edge facing a radially expanded section of the valve body, the outer edge more preferably facing an end stop surface of the radially expanded section of the valve body that is not covered by said first sealing structure. In this way, improved valve operation can be achieved, wherein the proximal section of the valve seat can serve as a guide to guide a distal part of the valve body into a closing position of the seat during valve assembly, and also e.g. during valve operation. An optional end stop is preferably configured to ensure proper valve body placement as well, preventing e.g. that the first sealing structure is pressed too deep and/or to hard into/onto the valve seat.

According to a preferred embodiment, the valve body has a proximal section that extends through a valve body receiving space defined in a valve mounting member of the product processing unit. The valve mounting member is preferably axially spaced-apart from said valve seat, and is preferably coaxial with respect to the valve seat. In this way improved valve and PPU manufacturability can be achieved, whilst maintaining desired system reliability. Moreover, the valve body preferably carries a second sealing structure for sealingly engaging the valve mounting member, in particular at any position of the valve body with respect to the valve seat.

Thus, product leakage between the valve mounting member and the valve body can be prevented. In one example, the second sealing structure can e.g. be a flexible sealing structure that is connected to the valve mounting member to provide a hermetical seal therewith, the flexibility of the second sealing structure allowing axial displacement of the valve body (e.g. between a said valve closing position and an valve opening position). Alternatively, the second sealing structure can be configured to provide a sliding seal, e.g. axially slidingly and (hermetically) sealingly engaging an opposite surface of the valve mounting member. In that case it is preferred that the second sealing structure is elastically compressible between the mounting member and the valve body.

According to a preferred embodiment, said valve mounting member is made of a welding beam transparent material, e.g. to allow passage of a welding beam (e.g. a laser beam or acoustic welding beam) to weld the mounting member to a corresponding section of the PPU during valve assembly. For example the mounting member can be made of an optically transparent material (e.g. a transparent, weldable plastic).

The first sealing structure and second sealing structure, carried by the valve body, are preferably integrated with each other (preferably being made in one-piece), so that a single sealing structure can be manufactured and applied to the valve body to provide both sealing structures. In other words, the first and second sealing structures are preferably two sections of the same (single) sealing structure, made in one-piece.

Also, it is preferred that the valve body and each (the) sealing structure are formed by two-component injection moulding.

For example, good results can be achieved in case the sealing structure is a an elastic plastic, an elastomer, a thermoplastic elastomer (TPE), silicone, PPE, 1-PPE or LL-PPE. The valve body is preferably made of polypropylene (PP), a polyarylether ketone PAEK, in particular PEEK (polyether ether ketone), a Polyethylene terephthalate thermoplastic (PET) polymer, a Polysulfone thermoplastic (PES) polymer, or a Polyoxy methylene thermoplastic (POM) polymer.

According to an embodiment, reliable and durable valve operation can be achieved in case the valve body encloses an actuator engagement space for receiving a distal section of a valve actuator of the dispensing machine, wherein the valve body includes an internal locking structure allowing engagement of at least one actuator hook member of the distal section of the valve actuator, when positioned in the actuator engagement space, for axially moving the valve body away from the valve seat (preferably without rotating the valve body) and vice-versa.

For example, the valve body and the distal section of the valve actuator can be configured to engage and disengage each other via a bayonet connection, after placement of the product container in the dispensing machine, in particular such that during operation the distal section of the valve actuator is axially movable into the valve body towards a first position, after which it is rotated to a second (valve engagement) position in which the actuator can axially displace the valve body from the valve seat.

Alternatively, for example, said engagement between the valve actuator and the valve body can be achieved by a clamping connecting or a clicking connection. Therein, it is preferred that a respective clamping force or clicking force, respectively, is sufficiently high to allow axial valve body displacement (between a closed and open valve body state) by the actuator. Moreover, it is preferred that a respective clamping force or clicking force, respectively, can be overcome by actuator retraction, allowing release of the product container from the dispensing machine.

Further, an aspect of the invention provides a product container, configured to cooperate with a product dispensing machine, after placement in the machine, the product container being defined by the features of claim 14.

In this way, above-mentioned advantages can be achieved.

Another innovative aspect of the invention, that can be combined with the above-described first aspect, is provided by the features of claim 16. In this way, improved PPU and respective product container manufacturing can be achieved.

Another innovative aspect of the invention, which can be combined with the abovementioned first and/or second aspect, is provided by the features of claim 18. In this way, reliable system operation can be achieved.

Also, an aspect of the invention provides a method for dispensing a foamed product, including the use of a system according to the invention, the method including:

- placing the product holder in the dispensing machine;
- pressurizing the content of the product holder, for example to a pressure of at least 5 bar;
- supplying pressurized gas to the processing unit of the product holder, by the gas supply of the dispensing machine;
- supplying product to the processing unit via the product feedthrough channel upstream of the at least one frothing device by automatically opening the valve of the processing unit by an actuator of the dispensing machine.

The method provide good hygiene, e.g. before initial use and also during system operation, and can also lead to reliable operation over relatively long time periods (allowing e.g. numerous servings over time, wherein the product valve can maintain good sealing before a first serving and between subsequent servings).

In the following, the invention will be explained further using exemplary embodiments and drawings. The drawings are schematic. In the drawings, similar or corresponding elements have been provided with similar or corresponding reference signs FIG. 1 schematically shows a perspective view of an exemplary foamed product dispensing system according to an example of the invention;

Figure 1:
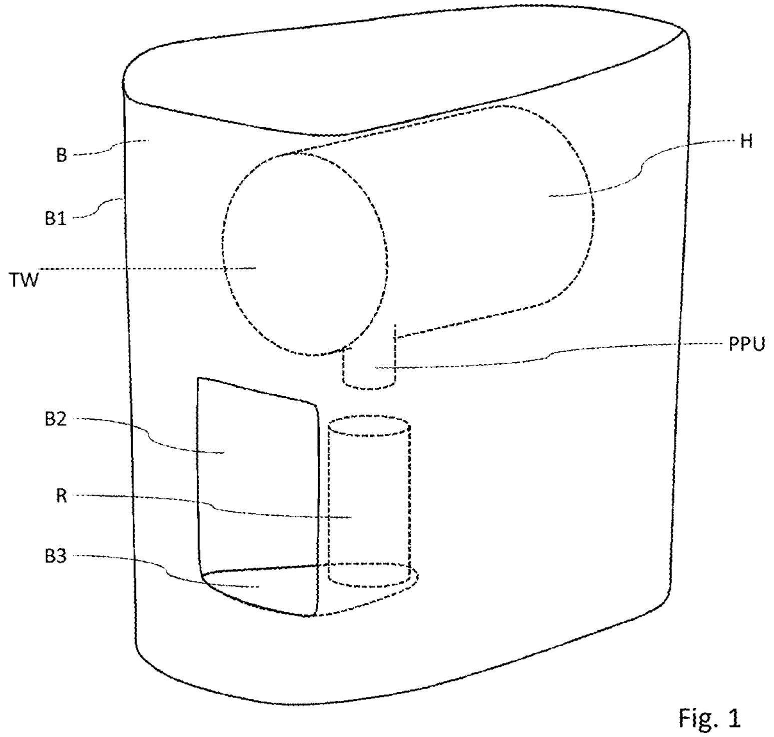

In an exemplary embodiment, as shown in FIG. 1, a foamed product dispensing system includes a product dispensing machine B, configured to receive an exchangeable product container H; a product container H, configured to cooperate with the product dispensing machine B, after placement in the machine B; wherein the product container H contains a foamable product P, preferably a food product, for example dairy cream (and preferably no milk concentrate), wherein the product container H is provided with a (integral) product processing unit PPU including a frothing device 15 (see e.g. FIG. 5) having a product entrance 15*i* for receiving product P and a product exit 15*u* for discharging product P. The processing unit PPU is connectable to a gas supply of the machine B (see e.g. FIG. 4, 5) for supplying gas to the PPU (and in particular to the product P, via the frothing device 15). The foamed product dispensing system is preferably not configured to supply water to the product that is to be foamed.

In an embodiment, the product dispensing machine B is configured to cool the foamable product P in the received product container H, for example by cooling the received product container, in particular to maintain a temperature of the product P in the container H within a predetermined temperature range, for example a temperature range of 4 to 7° C.

In an embodiment, the product dispensing machine B comprises the gas supply, wherein the gas supply is configured to supply gas at an operational pressure in the range of 3 to 10 bar, preferably in the range of 4 to 8 bar, for example about 5.5 bar. It is e.g. preferred that the machine B can pressurize the content of the container to a pressure above atmospheric pressure, e.g. a pressure of at least 5 bar.

In an embodiment, the product container H is configured to contain, and preferably contains, a volume of foamable product P in the range of 0.5 to 10 L, preferably in the range of 1 to 5 L, for example about 2 L.

Figure 5:
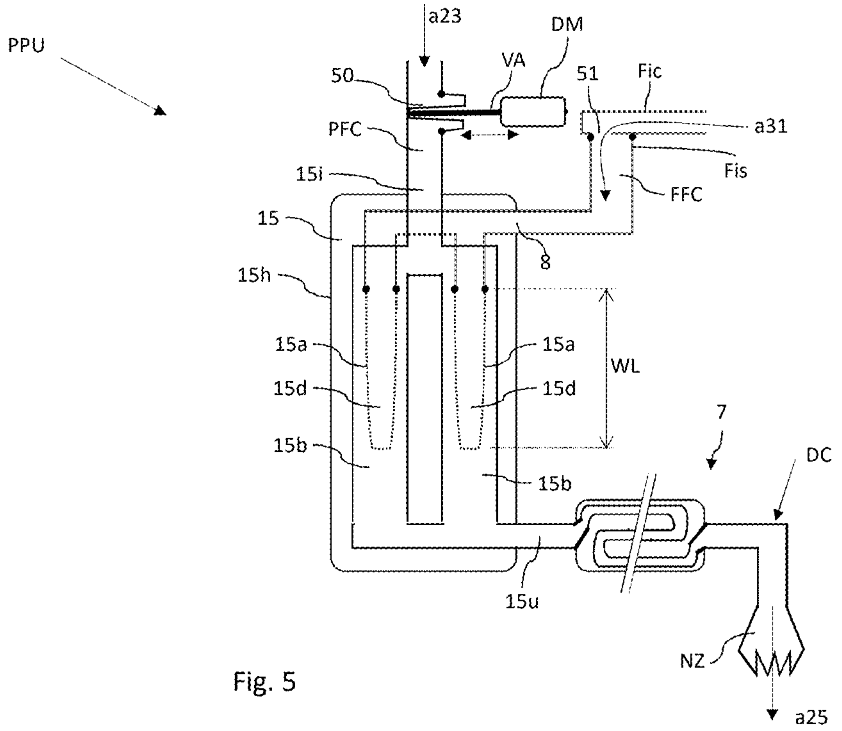
FIG. 5 shows a diagram of flow paths of the system of FIGS. 1-4.

In an embodiment, the product processing unit PPU includes a product feedthrough channel PFC upstream of the frothing device 15 (see FIG. 5, 6, 8A). Optionally, the product feedthrough channel PFC can provide a flow restriction FR with a representative transversal area in the range of 1 to 3 $mm^2$, preferably in the range of 1.2 to 2.2 $mm^2$, for example about 1.5 or 1.8 $mm^2$.

In a preferred embodiment, the frothing device 15 of the PPU is provided with one or more (preferably two) microfiltration walls 15*a* having gas transmissive pores, wherein the each microfiltration wall 15*a* separates a respective gas supply space 15*d* associated with the gas supply from a foaming channel 15*b* associated with the product entrance 15*i*, wherein each of the microfiltration walls 15*a* is preferably substantially tubular, extending at a respective wall length WL along a respective main axis, wherein a sum of the respective wall lengths WL of the microfiltration walls 15*a* is preferably in the range of 34 to 50 mm, preferably in the range of 38 to 46 mm, for example about 42 mm.

In an embodiment, the number of microfiltration walls 15*a* of the one or more microfiltration walls 15*a* is at least two, preferably two, wherein preferably one or more mutual differences in respective wall lengths WL of the at least two microfiltration walls 15*a* are smaller than 2 mm, preferably smaller than 1 mm, for example about 0 mm, wherein for example the respective wall length WL of each microfiltration wall 15*a* is about 21 mm. For example, the two (or more) microfiltration walls 15*a* can extend in parallel with each other.

In an embodiment, the product processing unit PPU comprises a processing device 7 arranged downstream of the microfiltration device 15 and configured for performing a mixing treatment and/or pressure reduction treatment of the product provided with gas, wherein the processing device 7 preferably comprises an undulating, in particular labyrinth type, fluid path for the product provided with gas, said fluid path preferably having a length of at least 30 cm, preferably at least 35 cm, more preferably at least 40 cm, for example about 40 cm or about 44.5 cm.

In an embodiment, the processing device 7, in particular the fluid path thereof, is substantially distributed throughout the PPU. A relatively long fluid path of the processing device 7 is for good product processing (e.g. pressure reduction) can thus be provided in a relatively compact PPU.

The product dispensing machine B can comprise a housing B1. The housing B1 (i.e. an external wall thereof) can include an opening B2, wherein the opening B2 provides access to a platform B3, wherein the opening B2 and platform B3 are configured for receiving a foamed product receiving receptacle R, e.g. a cup or a glass. Preferably, the opening/access is closable by a movable door D1 (depicted with a dashed line in FIG. 4).

Figure 2:
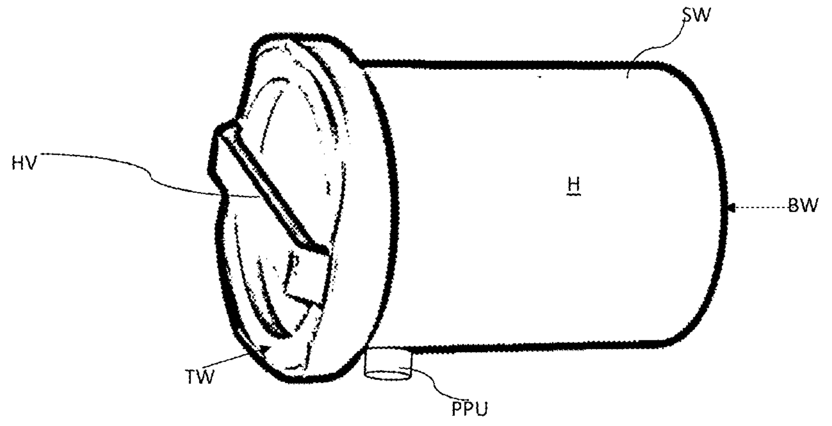
FIG. 2 shows a perspective view of a product container of the system of FIG. 1.

The exemplary system can further include the aforementioned exchangeable product container H, provided with a product processing unit PPU (see FIG. 2). The PPU may be located on several positions. In an advantageous example, the product processing unit PPU protrudes (e.g. radially) outwardly from the respective container H. In particular, the PPU can extend through an outer wall of the holder H, in particular spaced-apart from a top wall TW and a bottom wall BW of the holder H. Moreover, as follows from the drawing, in this embodiment, the PPU can be located near the top of the product container H.

The product container H can e.g. be a substantially cylinder-shaped or bucket-shaped capsule, for example having a rigid (e.g. metal or steel or rigid plastic) outer wall, being configured to be pressurized, e.g. to a pressure of at least 2 bar, preferably at least 5 bar. A preferred length L of the capsule (measured between a top wall TW and bottom wall BW in the present example) is in the range of about 20 to 40 cm, wherein an external diameter X of the capsule (i.e. a diameter of a cylinder wall extending between the top and bottom) is in the range of about 10 to 30 cm.

Figure 3:
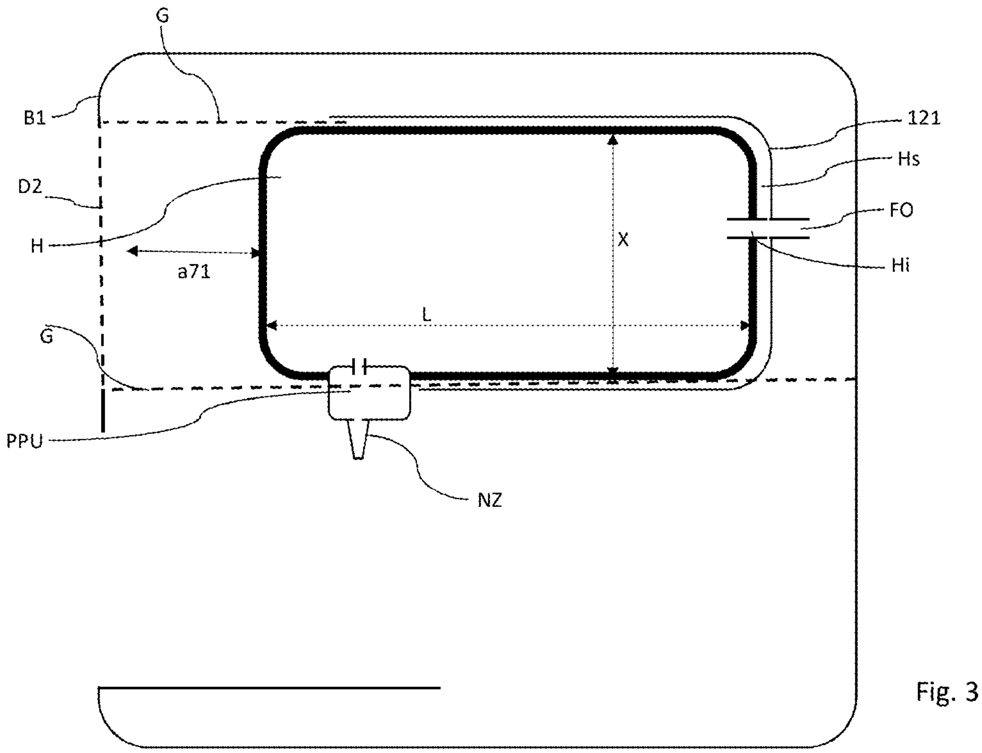
FIG. 3 shows a schematic vertical cross-section view of part of the system of FIG. 1, during unloading/loading a product container.

As shown in FIG. 3, the dispensing machine B preferably comprises a container receiving space Hs (e.g. defined by or located within a respective wall structure 121) for receiving the container H. The dispensing machine preferably includes a container guide G (shown with dashed lines) for guiding the container H into and out of a container receiving space Hs of the machine (along a placement direction, indicated by an arrow a71). Preferably, the container receiving space in the housing B1 of the machine can be sealed or closed off from an environment of the housing, in particular allowing improved temperature control of the product container H after loading. For example, the housing B1, and/or the afore-mentioned wall structure 121, may include a movable cover D2, e.g. a door for controlling access to the container receiving space Hs.

Optionally, as indicated by arrow a71 (FIG. 3), the container H can be substantially horizontally removable from the container receiving space Hs, e.g. for exchanging an emptied container with a filled container. Said container guide G can assist an operator in stably moving the container H towards a final position into the machine, and in the removing of a used-up container.

In an alternative container orientation (not shown), after loading (in the respective receiving space Hs, configured for receiving and holding the container H at the slanted orientation), a central (longitudinal) axis of the container H can extend at an angle with respect to a horizonal plane, in particular an angle smaller than 45 degrees and preferably smaller than 30 degrees. For example, the angle can be in the range of about 10-30 degrees. In this case, the container H can be removable from the container receiving space Hs, along a respective oblique direction. The respective slanted orientation, wherein a distal end of the container (i.e. a container bottom) is preferably located lower than a proximal section (near the PPU) allows for efficient user-friendly handling of a filled container during loading.

Figure 4:
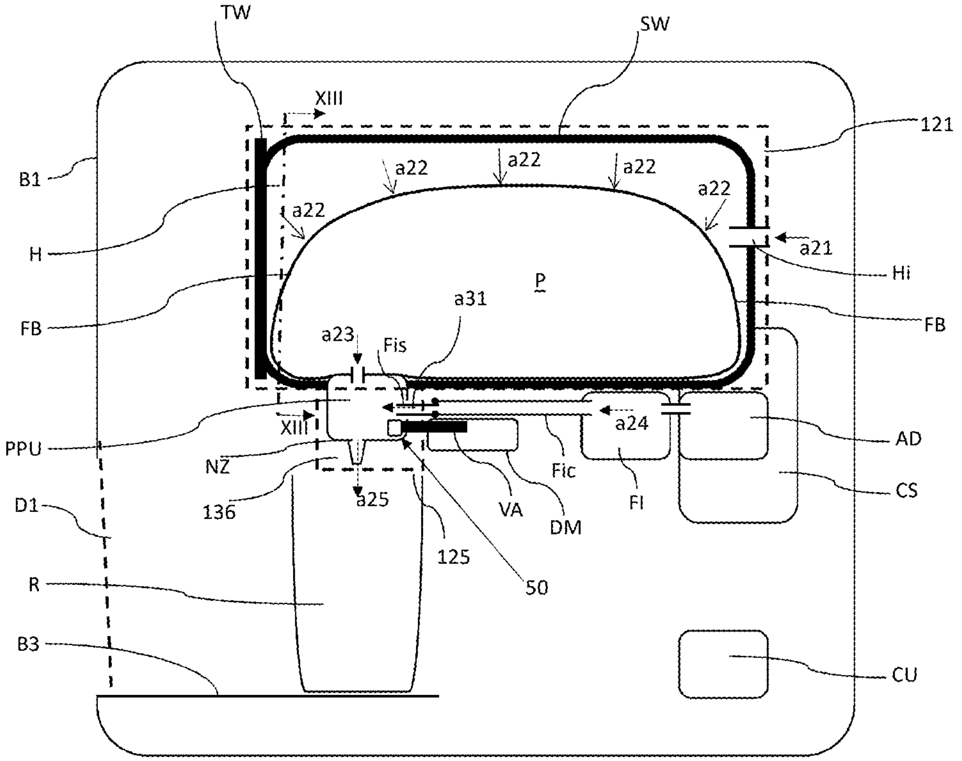
FIG. 4 is similar to FIG. 3, showing further components of the system.

With particular reference to FIG. 4, the machine can be configured such that placement of the container H in the container receiving space Hs causes one or more connectors of the machine B to connect to respective connectors of the container H. For example, container placement can cause an optional pressurizing fluid output connector FO of the machine B to be automatically connected to an optional fluid input connector Hi of the container H (for pressurizing an interior of the container). As a further example, such placement can cause a gas injector connector Fic of the machine B to be connected to a gas injector socket Fis of a product processing unit PPU of the container H (see FIG. 4, 5).

A removing of a container H from the machine can cause the one or more connectors of the machine B to become disconnected from the respective connectors of the container H. The machine B and/or the container H may include means for securing the container H in the container receiving space Hs, in order to prevent accidental and/or unauthorized removal of the container H from the container receiving space Hs, as will be appreciated by the skilled person.

The container H, in particular a product holding space (interior space, reservoir) thereof, can be filled with various types of product. The product comprises, in particular, a food, for instance, a product safe for human consumption. The product comprises, for instance, one or more of: cream, spray cream, or a dessert (for instance, a mousse forming product). The product can comprise a dairy product or a milk product, for instance, cream or milk.

According to an advantageous elaboration, the product P present in the container H is a homogeneously foamable product, and in particular a food product, cream, spray cream, (milk) shake, milk, ice cream or dessert, more particularly a dairy product or milk product. The product P can be, for instance, cream. The product P can optionally contain, for instance, a propellant or blowing agent (for instance, in a condition at least partly dissolved in the product), in particular a propellant consisting of one or more of: air, N2 and/or N2O. Such a propellant or blowing agent is, in particular, safe with regard to food technology. The propellant or blowing agent can hold the inner space 4, for instance, at a particular super-atmospheric prepressure. Preferably, the product P does not contain a blowing agent.

In FIG. 4, an example of the container H is shown in more detail, containing a quantity of product P held in a flexible bag FB within the container H. During operation of the machine B, the container H is preferably pressurized by the dispensing machine by a gas, e.g. air, being by the machine pumped through a fluid input Hi (as indicated by arrow a21), causing the interior of the container H to become pressurized at a super-atmospheric pressure (preferably a pressure of at least 5 bar). Consequently, pressure is exerted on the flexible product bag FB, as illustrated by arrows a22. The pressure, possibly in combination with gravity, causes the product P to flow (indicated by arrow a23) from the flexible bag FB into the downstream product processing unit PPU, that is, in case a valve 50 of the product processing unit PPU is brought to an operational state providing a product flow connection towards a respective product processing space (as will be explained below), discharging foamed product via a respective outlet (indicated by arrow a25).

The flexible bag FB as such can have various configurations and shapes. For example the bag can be made of one or more flexible layers of one or more plastic or plastic substances, and/or of one or more flexible layers of paper or paper substances, and/or one or more flexible layers of metal or metal substances (e.g. aluminium). The flexible bag can be entirely flexible but that is not required. It can e.g. include or more foldable bag sides that fold inwardly during product discharge. In particular, the flexible bag FB is configured to allow a bag volume decrease during discharging product from the bag FB.

In yet a further embodiment, the product processing unit PPU and the flexible bag FB are integrally joined with each other (into an assembly). For example, a top wall or top section of the product processing unit PPU can be made in one piece, or welded or glued to, the flexible bag, or joined to the bag FB in another manner. The assembly of the product processing unit PPU and bag FB can be removably held by an outer part SW (shell) of the container H. For example referring to FIG. 2, the top wall TW of the container may be a removable, at least hingeable, cover, that can hermetically seal the interior of the container H (in a gastight manner) when the cover wall TW is in the depicted closed position (e.g. located on top of a side wall SW). The top wall TW can be removed from a remaining container part SW, wherein optionally the top wall TW and remaining container part SW can remain connected at a connecting hinge, allowing access to the flexible bag FB that is located in the container H. Then, preferably, the flexible bag FB and its processing unit PPU can be removed from the container (e.g. after use, e.g. when the bag is empty), to be replaced with a fresh product containing flexible bag and respective processing unit PPU. After the new filled flexible bag FB and PPU have been properly positioned within the container shell, the top wall TW can be installed again for hermetically sealing the container again (allowing pressurization of the container interior and respective flexible bag FB). In this embodiment, in particular, the exterior SW of the container H can act as a bag positioning structure, for installing and holding a flexible bag (and its PPU) in a desired operation position within the machine B. The container shell (i.e. the outer wall SW of the container) itself can be made of a rigid material. A single container shell SW can be used to subsequently operate with a number of replaceable flexible bag-PPU assemblies. This also leads to advantages concerning transport and storage, since a relatively large number of flexible product container bags FB can be transported and/or stored in a relatively small transport resp. storage space (whereas transporting a large number of rigid outer container shells can require more space).

In an embodiment, the filled flexible bag FB is fixed to its container H, forming a Bag-in-Box (BIB) structure, to be exchangeably held by the machine.

In an embodiment, a container H that includes a flexible bag FB (as in the above example), wherein the exterior walls TW, SW of the container H act as a bag pressurization chamber, is entirely removable from the machine B.

In an alternative embodiment, only the flexible bag-PPU-assembly is removable from the machine B, e.g. when the container H has been opened by removing, at least hinging, the lid/cover wall TW, leaving an outer part SW of the container in the machine B during the exchange of the bag. In such an embodiment, the flexible bag-PPU-assembly as such can be called the "exchangeable product container", to be placed in a pressurization chamber of the machine B. In yet another embodiment of the invention, the product container as such can have a fully or at least partly flexible outer wall, the product container being placed in a dedicated pressurization chamber of the machine B during operation.

FIG. 4 further shows the machine B to include an optional air dryer AD for supplying dried air, e.g. dried ambient air.

The air dryer AD may be embedded in or forming part of a cooling system CS of the machine B, for example a cooling system CS configured to cool the product container H as well. During operation, the dried air is preferably received from the air dryer AD by a gas injector FI, which is configured to supply the dried air into the product processing unit PPU via a gas injector connector Fic (indicated by arrow a24). During use the supplied air flows into a gas feedthrough channel FFC of the PPU, see arrow a31 in FIG. 5.

Preferably, the dispensing machine includes a valve actuator VA (see FIG. 4, 12, 13). The valve actuator VA is configured to actuate a valve member 50 of the product processing unit PPU through actuation, and preferably via translational actuation (after coupling to the valve). A respective valve actuator can be configured in various ways and may include a servo motor, electromotor, electromagnetic actuator or other drive means DM. In particular, the actuator can include an automatically movable rod or similar elongated element VA (being movable by said actuator drive means DM), the movable rod or elongated element having a distal end 98 that can couple to a valve body 51 of the PPU valve 50. For example, the valve body can be a hollow body (having an open actuator entry port), configured to releasingly receive the distal section 98 of the actuator VA.

As shown in FIG. 5, the valve actuator VA can be provided substantially separate from the gas injector connector FIc, wherein for example a separate actuator can be provided for actuating the gas injector connector, or wherein for example the system is configured such that placement of a product container H automatically connects the PPU to the gas injector.

With further reference to FIG. 4 (see also FIG. 5), the product processing unit PPU can be configured to mix the product P with e.g. the dried air as they are being supplied to the product processing unit PPU, resulting in a foamed product being discharged from the product processing unit PPU, as indicated by arrow a25. A product discharge channel DC of the PPU, which channel can e.g. form the widening fluid path or part thereof, can terminate e.g. via a product shaping nozzle NZ, e.g. having an array of product-shaping teeth or the-like (known as such, and sometimes called a 'tulip'). During use, a receptacle R, e.g. a dish, bowl, glass or cup, may be exchangeably placed near, e.g. under, the product processing unit PPU—onto the respective platform B3—for receiving the discharged foamed product.

The machine B may be provided with a control unit CU being configured for controlling fluid flow and product flow to the processing unit PPU, for example by controlling activation and deactivation of fluid flow means (e.g. a pump, servo, motor etc.).

Further, the control unit CU can be configured for controlling a position of the PPU valve member 50 through the respective valve actuator VA (in particular by controlling respective drive means DM).

Preferably, in case of initiating a product discharge, the control unit is configured to start fluid flow before product flow. The control unit is preferably at least partly user operable via a user interface or operating device (not shown) of the machine B, e.g. via a touch display, control knob, switch or the-like.

Figure 6:
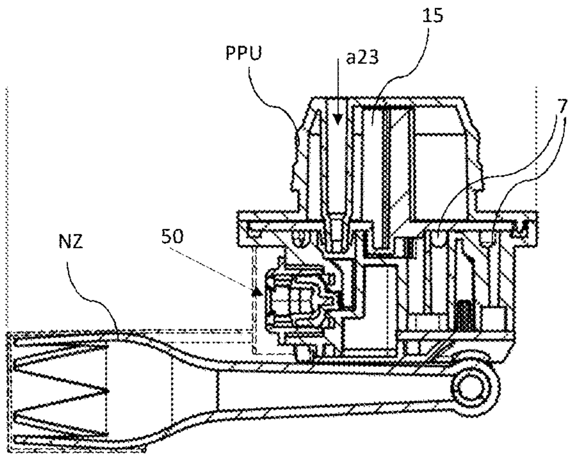
FIG. 6 shows a cross-section of an example of a PPU of the system shown in FIGS. 1-5.
Figure 7A:
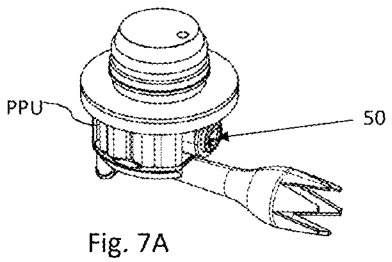
FIG. 7A shows a perspective view of the PPU of FIG. 6.
Figure 7B:
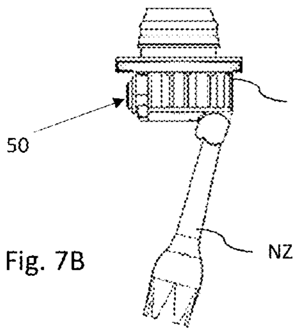
FIG. 7B shows a side view of the PPU of FIG. 6, when the nozzle has rotated to a discharge position.

FIGS. 6 and 7A, 7B show an example of the PPU in more detail. For example, the nozzle NZ may be pivotally coupled to a remaining PPU section, such as between an initial transport condition (as in FIGS. 6, 7A) to a downwardly extending discharge position (as in FIG. 7B).

As is mentioned before, the product processing unit PPU includes a product feedthrough channel PFC upstream of the at least one frothing device 15. The product feedthrough channel PFC includes a valve 50 for controlling product flow towards the frothing device 15.

Figure 8A:
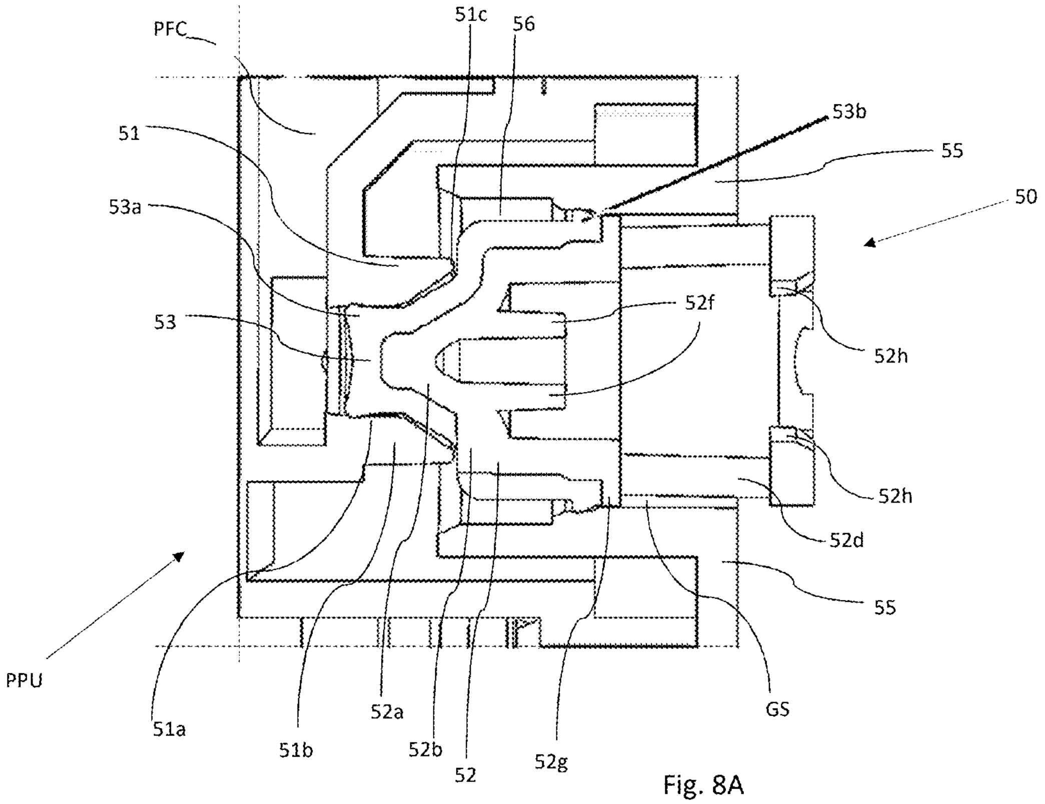
FIG. 8A shows part of the PPU of FIG. 6, when the valve is in a closed state.

Referring to FIGS. 6 and 8A, it is preferred that the valve 50 has a valve seat 51 that is closable by distal section 52*a* of a respective valve body 52. The distal section 52*a* of the valve body 52 preferably carries (e.g. is surrounded by and/or embedded in) a first sealing structure 53.

Figure 9A:
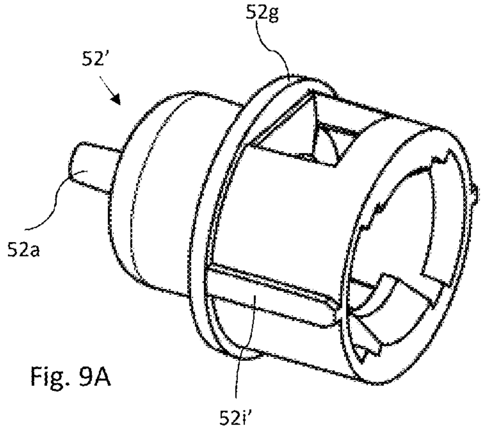
FIG. 9A shows a perspective view of a further example of a valve body for the PPU of FIG. 6.
Figure 9C:
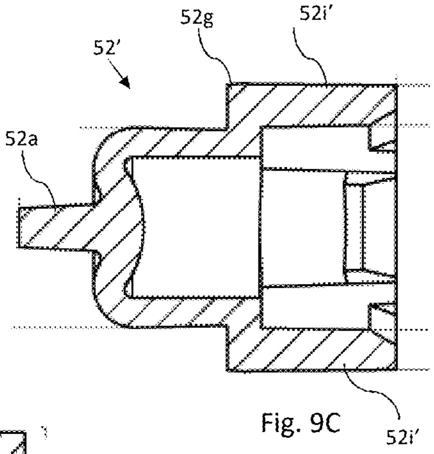
FIG. 9C is a second longitudinal cross-section of the valve body of FIG. 9A.
Figure 9B:
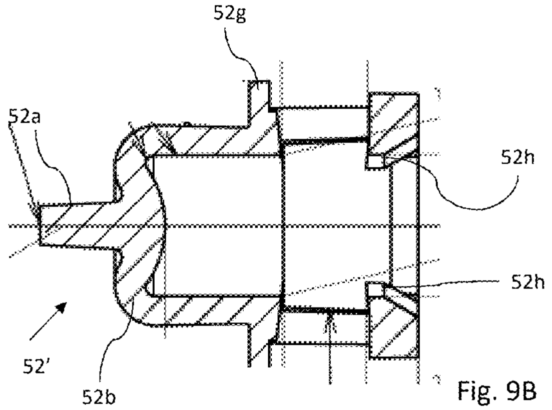
FIG. 9B is a first longitudinal cross-section of the valve body of FIG. 9A.
Figure 10A:
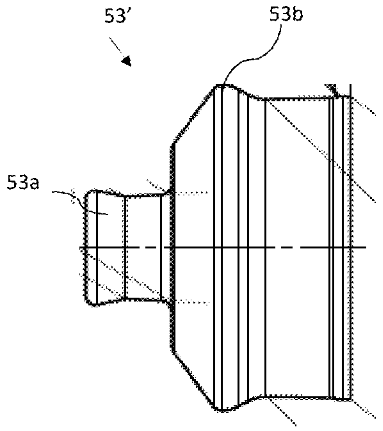
FIG. 10A is a side view of a sealing structure of the valve body of FIG. 9A.
Figure 10B:
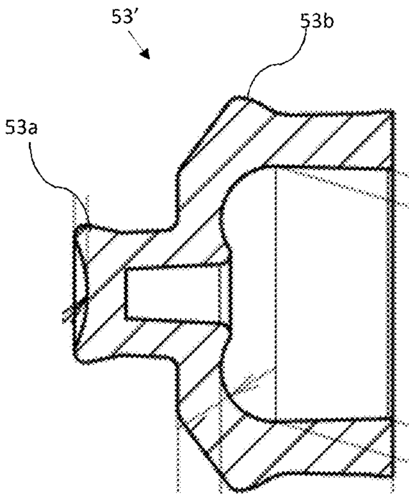
FIG. 10B is a longitudinal cross-section of the sealing structure of FIG. 10A.

An example of a valve body 52 as such is shown in more detail in FIGS. 9A, 9B, 9C. A respective sealing structure 53 is shown in FIGS. 10A, 10B. As follows from FIG. 11, the valve body 52 and sealing structure 53 can e.g. be slidably held in a mounting member (e.g. a valve retainer) 55.

The valve seat 51 preferably has a substantially cylindrical inner wall 51*a* for slidingly and sealingly engaging the first sealing structure 53 at at least two different axial closing positions of the valve body 52 with respect to the valve seat 51. In particular, the valve body sealing structure 53 can act as a piston, movably engaging (and hermetically sealing) the valve seat cylinder 51*a*, at each valve closing position. Preferably the sealing structure 53 can be axially moved out of the valve seat (by moving the respective valve body to a third position) for opening the valve.

According to an embodiment, the distal section 52*a* of the valve body 52 reaches at least partly into a space that is enclosed by the cylindrical wall section 51*a* of the valve seat when the valve body is in each said closing position, but that is not required.

Optionally, the valve 50 provides for example a first closing position and a second closing position that is spaced-apart from the first closing position by at least 1 mm.

In this way, the valve 50 can provide very good sealing of the product feedthrough channel, e.g. during relatively rough transport, during storage, before initial use of the respective product container H (e.g. when the container is not yet pressurized by the machine B, a content of the container H e.g. being at atmospheric pressure or slightly above atmospheric pressure).

The valve body 52 and sealing structure 53 can provide a durable, reliable valve operation and are preferably formed by two-component injection moulding. The sealing structure 53 can e.g. be a thermoplastic elastomer TPE, silicone, PPE, l-PPE or LL-PPE. The valve body 52 can e.g. be made of polypropylene PP, a polyarylether ketone PAEK, in particular PEEK polyether ether ketone, a Polyethylene terephthalate thermoplastic PET polymer, a Polysulfone thermoplastic PES polymer, or a Polyoxy methylene thermoplastic POM polymer.

The sealing that is achieved by the valve 50, when the valve body is in one of its closing positions, is preferably a hermetical seal (e.g. a gastight seal), to prevent environment air entering the upstream product feedthrough channel PFC (i.e. the valve providing an aseptic seal).

In yet another embodiment, the valve body and the sealing structure(s) are made of the same material.

Moreover, as mentioned before, it is preferred that the valve body 52 (and respective sealing structure 53) is axially displaceable from said closing positions to a third axial position for removing its distal section 52*a* from the substantially cylindrical inner wall 51*a* of the valve seat 51, to allow product flow through the valve 50. Such a third axial position is shown in FIG. 8D, wherein product flow is shown by arrow a23. In particular, the sealing structure 53 has been removed from the valve seat 51 when the respective valve body 52 is in a third axial position, thereby opening the respective part of the product feedthrough channel PFC.

Preferably, the first sealing structure 53 has a radially expanded section 53*a* that is elastically compressed by substantially cylindrical inner wall 51*a* of the valve seat when the valve body 52 is in a said axial closing position.

Further, the first sealing structure 53 can be configured for entirely closing a product flow channel part defined by the substantially cylindrical inner wall 51*a* of the valve seat 51, when the valve body is in a said axial closing position, the first sealing structure 53 in particular including a closed top section 53*a* that axially—and preferably radially—covers (i.e. embeds) the distal section 52*a* of the valve body 52.

For example, the valve seat 51 can include a radially diverging (tapered, frusto-conical) proximal section 51*b*, extending from the cylindrical section 51*a*. In this way, the valve body 52 can be guided and centered back into a respective closing position with relative ease by the actuator VA, from a respective valve opening position. Moreover, this allows ease of valve assembly during PPU assembly.

The radially diverging proximal section 51*b* of the valve seat 51 preferably has an outer edge 51*c* facing a radially expanded section 52*b* of the valve body (i.e. having an outer diameter that is larger than an outer diameter of the distal part 52*a*), the outer edge 51*c* of the seat more preferably directly facing an end stop surface 52*c* of the radially expanded section 52*b* of the valve body itself (i.e. a surface 52*c* that is not covered by said first sealing structure 53). For example, the sealing structure 53 can include one or more gaps or openings, through which respective sections of the valve body 52 can extend to provide one or more of such end stop surfaces 52*c*. After assembly, the opposite seat edge 51*c* and valve body end stop surface 52*c* can limit further inward valve body movement, thereby defining a most inner axial closing position of the valve body 52 with respect to the valve seat 51.

Also, a proximal section 52*d* of the valve body 52 can extend through a valve body receiving space 56 defined in a valve mounting member (i.e. a valve retainer/valve guiding member) 55 of the product processing unit PPU, the valve mounting member 55 in particular being axially spaced-apart from said valve seat 51, and preferably being coaxial with respect to the valve seat 51. For example, the valve mounting member 55 can be an element that is connected (e.g. welded) to a wall section 99 of the PPU during valve assembly, as follows from FIG. 13 (showing a position of the mounting member 55 before/during assembly).

Preferably, the valve body carries a second sealing structure 53 for sealingly engaging the valve mounting member 55, in particular at any position of the valve body 52 with respect to the valve seat 51. Also, the second sealing structure 53 can act as a valve body positioner during valve assembly, wherein the mounting member 55 can hold the valve body 52 and position the valve body in the PPU, centrally with respect to the valve seat 51, when the mounting member 55 is being assembled to a corresponding PPU wall structure 99.

The first sealing structure and second sealing structure, carried by the valve body, are preferably integrated with each other (i.e. provided by the same structure 53).

Said valve mounting member 55 can e.g. have a cylindrical internal wall 55*a* that defines a cylindrical valve body guiding space GS, the valve body 52 preferably having a circumferential rim 52*g* for slidingly engaging an inner surface of the cylindrical internal wall 55*a* of the valve mounting member 55.

The second sealing structure 53 preferably includes a radially expanded circumferential rim 53*b* (e.g. abutting said rim 52*g* of the valve body 52) that is elastically compressed between the valve body 52 and the cylindrical internal wall 55*a* of the valve mounting member, preferably when the valve is in a closed state and also when the valve is in an opened state.

More preferably a state of elastic compression of the rim 53*b* of the second sealing structure 53 depends on a valve body position with respect to the valve seat 51 (and mounting member 55). For example, it is preferred that the rim 53*b* of the second sealing structure 53 is radially compressed to a lesser degree when the valve body 52 is in a closing position than a degree of compression of that rim 53*b* when the valve body 52 is in an opening position. This can be achieved, for example, by the cylindrical internal wall 55*a* of the valve mounting member 55 having two adjoining sections with different diameters, i.e. a first wall section having a first diameter and a second wall section having a second diameter that is (slightly) smaller than said first wall section, wherein the rim 53*b* of the second sealing structure 53 is located (and compressed) in the first section of the cylindrical internal wall 55*a* of the valve mounting member 55 when the valve body is in a closing position, and wherein the rim 53*b* of the second sealing structure 53 is located (and compressed) in the second section of the cylindrical internal wall 55*a* of the valve mounting member 55 when the valve body 52 is in an opening position. In this way, the second sealing structure 53 can act as a spring means or positioning means, e.g. for spring-biasing the valve body 52 towards the valve seat 51, in particular during assembly and during a closing operation of the valve.

Both the cylindrical wall 51*a* of the valve seat 51 and the sealing structure(s) 53 can e.g. be circle-symmetrical structures, being concentrically arranged with respect to a central axis of the valve. Similarly, the cylindrical valve body guiding space GS can be of circle-cylindrical shape. Also, preferably the respective mounting member 55 (which can defined the valve body guiding space GS) can be a circle-symmetrical structure, being concentrically arranged with respect to a central axis of the valve after assembly, for centrally positioning the valve body and sealing structure. Moreover, a compact and sturdy configuration can be achieved in case the mounting member 55 includes a cylindrical wall 55*a*, having a concentric mounting flange (radially protruding from the wall 55*a*) at or near a proximal side.

Figure 8B:
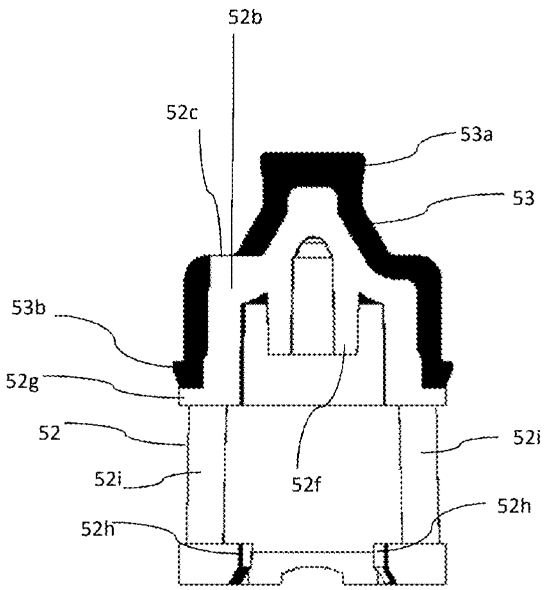
FIG. 8B shows a cross-section of the valve body and sealing structure of the PPU shown in FIG. 8A.
Figure 8C:
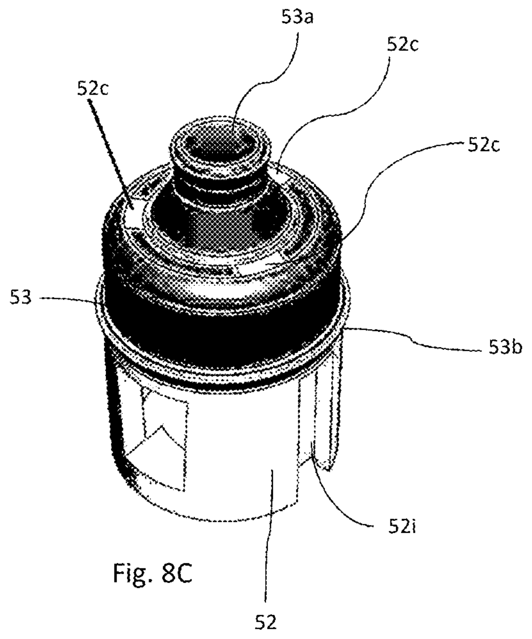
FIG. 8C shows a perspective view of the valve body and sealing structure of the PPU shown in FIG. 8A.
Figure 8D:
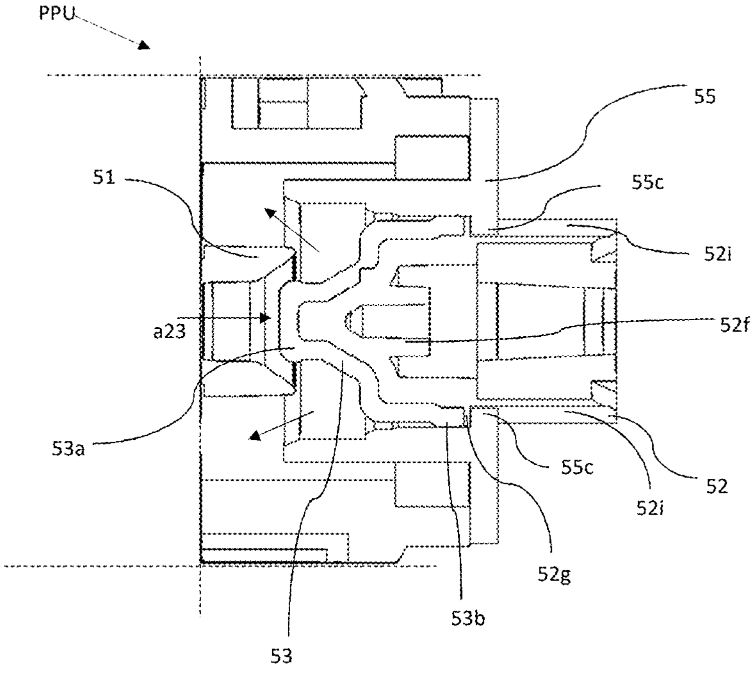
FIG. 8D is similar to FIG. 8A, showing an opened valve state.
Figure 11:
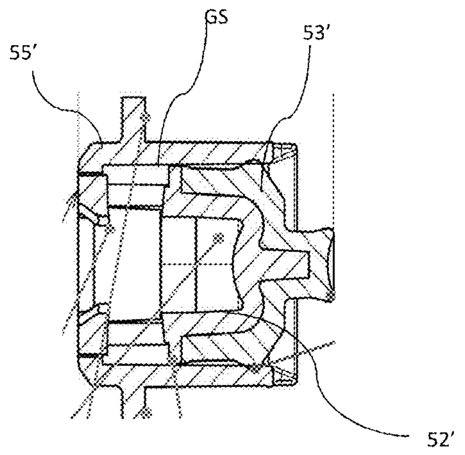
FIG. 11 shows a cross-section of an assembly including the valve body, sealing structure and a mounting member of the PPU of FIG. 6.

Optionally, the valve body 52 and mounting member 55 can include cooperating axial guiding cam/slot sections 52*i*, 55*c* for axially guiding the valve body with respect to the mounting member, for example inwardly protruding cams 55*c* of the mounting member which reach into axial slots 52*i* of the valve body 52 (see FIGS. 8A-8C). FIGS. 9A-9C depict an alternative valve body 52' that has axial cams/protrusions for cooperating with respective guide slots of a suitable mounting member 55', for axial guidance of the valve body with respect to the mounting member. A respective sealing structure 53' fitting on the valve body 52' is shown in FIGS. 10A, 10B, whereas FIG. 11 shows an assembly of the valve body 52', sealing structure 53, and respective mounting member 55'.

The valve body 52 can enclose an actuator engagement space for receiving a distal section 98 of a valve actuator VA of the dispensing machine B. The valve body 52 can e.g. include an internal locking structure 52*h* allowing engagement of at least one actuator hook member 95 of the distal section of the valve actuator, when positioned in the actuator engagement space, for axially moving the valve body 52 away from the valve seat 51 and vice-versa. For example, the valve body 52 and the distal section 98 of the valve actuator VA can be configured to engage and disengage each other via a bayonet connection, after placement of the product container H in the dispensing machine B, in particular such that during operation the distal section of the valve actuator VA is axially movable into the valve body 52 towards a first position first, after which the actuator distal section 98 is rotated to a second position in which the actuator (e.g. its one or more hook members 95) can axially displace the valve body 52 from the valve seat 51.

As an example, the locking structure 52*h* of the valve body can be provided by one or more radially inwardly extending notches or protrusions, that can be axially engaged by said one or more valve actuator hook members 95 once the actuator VS is in its valve engagement position.

Also, the valve body 52 and valve actuator VA are configured to engage one another such that the actuator can return the valve body from its opening position back to a said closing position, via axial displacement (without turning the valve body). This can be achieved e.g. via interlocking hook members. In an embodiment, the distal section, or tip, 98 of the actuator can be dimensioned such that it can engage an axially opposite inner pressing surface of the valve body 52, for pressing the body 52 axially towards the valve seat 51. Optionally, such an inner pressing surface can be provided by an internal, centrally arranged pressing section 52*f* of the valve body.

FIGS. 12A-12E show subsequent, preferred, valve operation steps. In particular, use of the system can include placing the product holder H in the dispensing machine B, and pressurizing the content of the product holder H, for example to a pressure of at least 5 bar. Also, during use, pressurized gas can be supplied to the processing unit PPU of the product holder H, by the gas supply of the dispensing machine B.

Product can be supplied to the processing unit PPU via the product feedthrough channel PFC upstream of the at least one frothing device 15 by automatically opening the valve 50 of the processing unit PPU by an actuator VA of the dispensing machine B. The opening of the valve includes the valve actuator VA engaging the valve body 51 and axially moving the valve body away from the valve seat 51. Suitable drive means DM can be controlled for providing valve actuator movements.

Figures 12A, 12B:
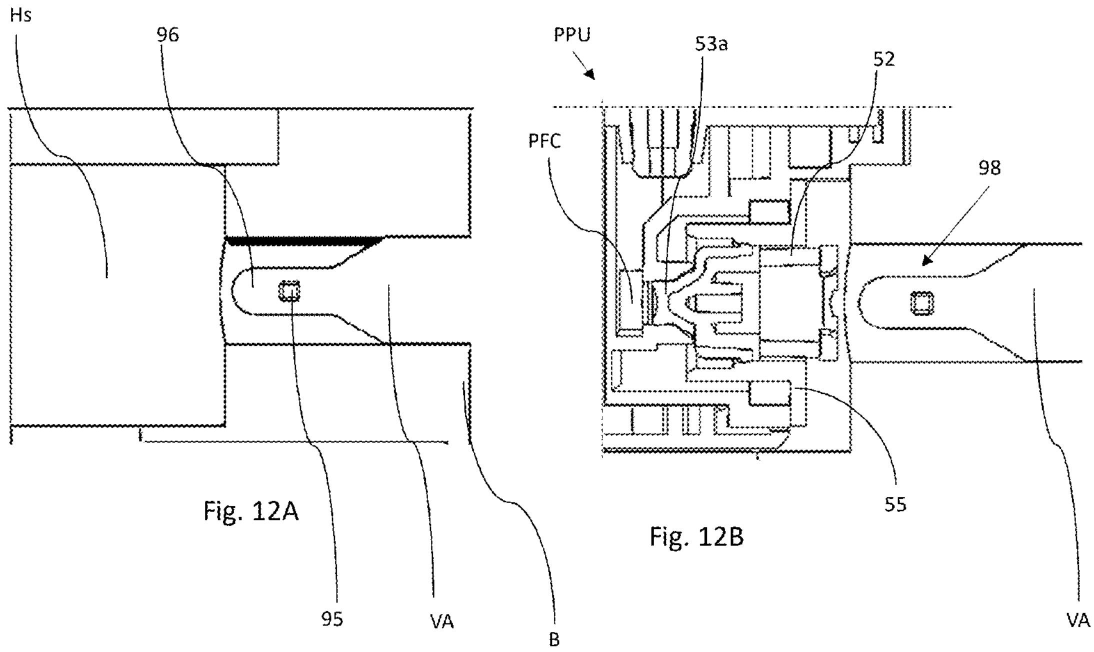
FIGS. 12A-12E show different actuator states and respective container valve states, during operation.
Figure 12C:
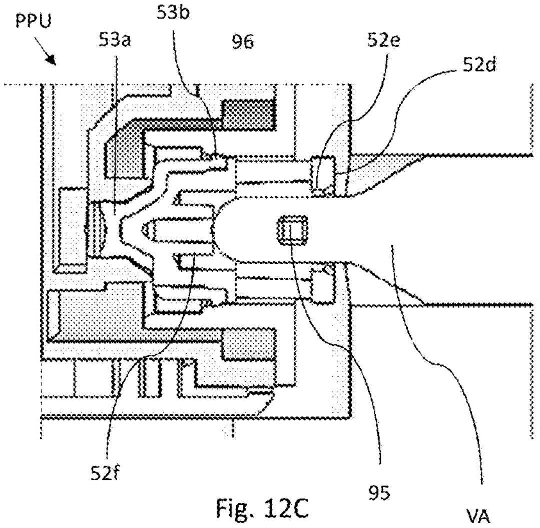

In particular, FIG. 12A shows a detail of the system before the product holder H is placed in the machine. In this case, the valve actuator VA is retracted to an idle position.

In FIG. 12B a product holder H has been placed in the machine B. In this case, the valve actuator VA still retracted to an idle position, and is located opposite to the valve 50. After product holder placement, the valve actuator VA is located opposite the valve body 52 of the PPU of the respective product container (i.e. opposite an actuator entry port of the valve body), and is substantially aligned therewith Subsequently, the valve actuator VA can be axially moved towards the valve, wherein the distal part 98 of the valve actuator VA can enter the valve body 52 (via its entry port) towards a respective first actuator position. A distal tip 96 of the valve actuator VA may engage or contact an optional inner pressing section 52*f* of the valve body 52, once the tip has penetrated the valve body, but that is not required.

Figure 12D:
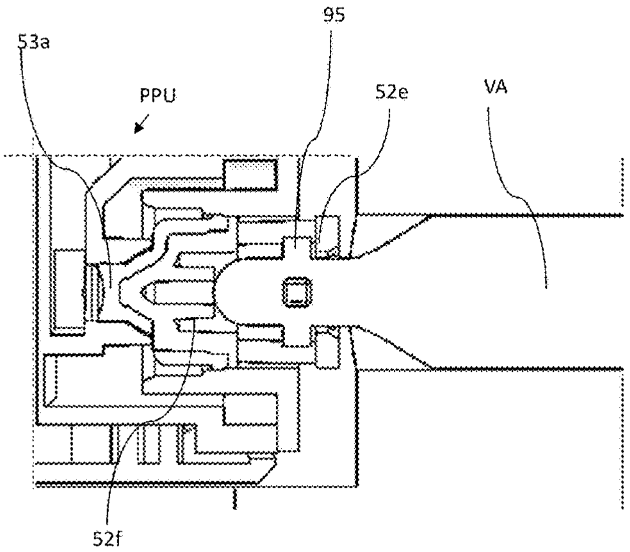

Next, the valve actuator VA is rotated, e.g. over an angle of about 90 degrees, to move its one or more hook members 95 to a respective valve body engagement position, shown in FIG. 12D.

Figure 12E:
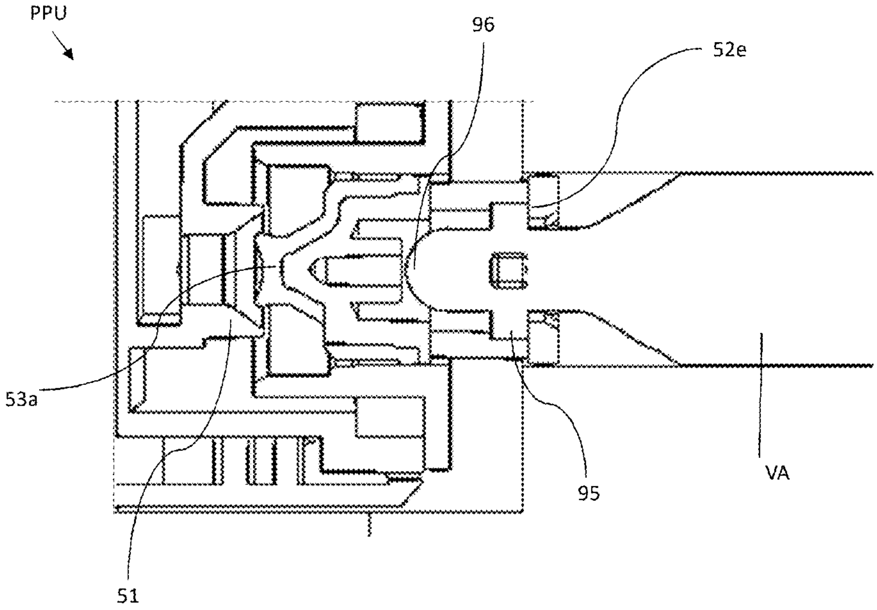

Then, the valve actuator VA can be axially retracted (without rotation), away from the valve seat 51 of the PPU, to bring the valve body 52 to a respective valve opening position, as shown in FIG. 12E, thereby removing the sealing structure 53 from the valve seat and allowing product flow. Each hook member 95 hereby engages the valve body 52, in particular its proximal section 52*d*, e.g. proximal valve body flanges or protrusions 52*e*. The proximal section of the sealing structure 53 can maintain a hermetical seal between the valve body 52 and the PPU, in particular via sealing engagement with the mounting member 55, thereby avoiding product leaking to an environment. Moreover, in a preferred embodiment, the retraction of the valve body 52 leads to (additional) compression of a said proximal sealing rim 53*b* of the sealing structure, providing hermetical sealing of the guiding space G to prevent product leakage (at a relatively high product processing pressure). Also, the distal section of the actuator VA can remain valve body engagement (e.g. via the actuator tip 96) to prevent that the valve body 52 is pressed out of the PPU by internal product processing pressure.

Subsequently, the valve can be closed via the valve actuator VA, by the dispensing machine B axially moving the valve actuator VA back to its first position so that the valve actuator presses the first sealing structure 53 via the valve body 52 into the valve seat 51 (without rotating the valve body). For example, a central tip section 96 of the valve actuator can engage a said central internal pressing section 52*f* of the valve body to press the valve body 52 back to a respective closing position. According to an embodiment, the internal pressing section 52*f* of the valve body can e.g. be configured to be engaged or contacted by the valve actuator once the valve actuator has been brought into a respective first position (see e.g. FIG. 12C), but that is not required.

In this way, swift and reliable valve operation can be achieved, iteratively, for reliably providing a large number of product discharged.

After use, e.g. when the product container H has been emptied, the valve actuator VA can be removed from the valve body by rotating the valve actuator back to an initial position (as in FIG. 12C) after which it can be retracted from the PPU and the product container H can be removed from the machine B.

Figure 13:
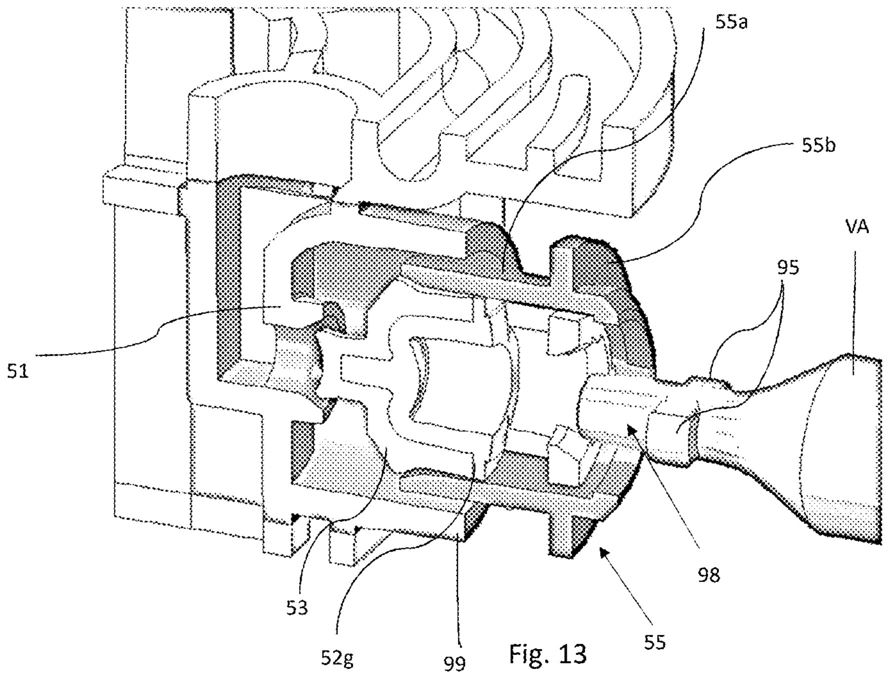
FIG. 13 shows a perspective exploded view of an example of the valve section of the PPU.

FIG. 13 shows a perspective exploded view of an example of the valve section of the PPU, and part of a respective valve actuator VA. It is preferred, as follows from the above, that the valve has a separate valve mounting member 55, that can be connected to a valve chamber or valve section 99 of the PPU to accommodate the valve body 52 and sealing structure 53, and for sealing the valve chamber from an environment. During assembly, a rim 55*b* of the mounting member 55 can be sealingly connected to an opposite surface of the PPU. Preferably, the mounting member 55 and valve body 52 are jointly positioned onto the PPU before connecting. In case a transparent mounting member 55 is used, laser welding can be used for providing a reliable seal between the rim 55*b* and the PPU valve chamber section 99. Also or alternatively, acoustic welding can be applied to connect the mounting member 55 to the PPU wall.

Figure 14A:
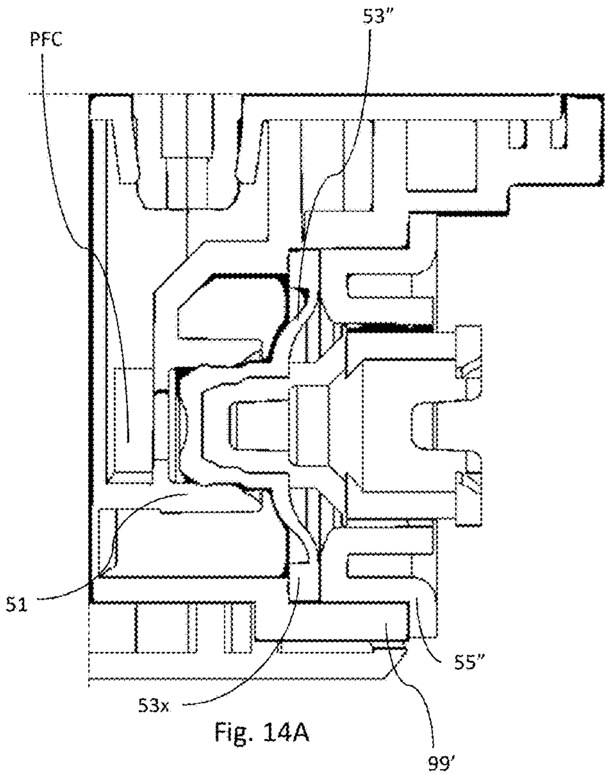
FIGS. 14A, 14B depict cross-sections of a second PPU valve embodiment, with the valve in a closed and open position respectively.
Figure 14B:
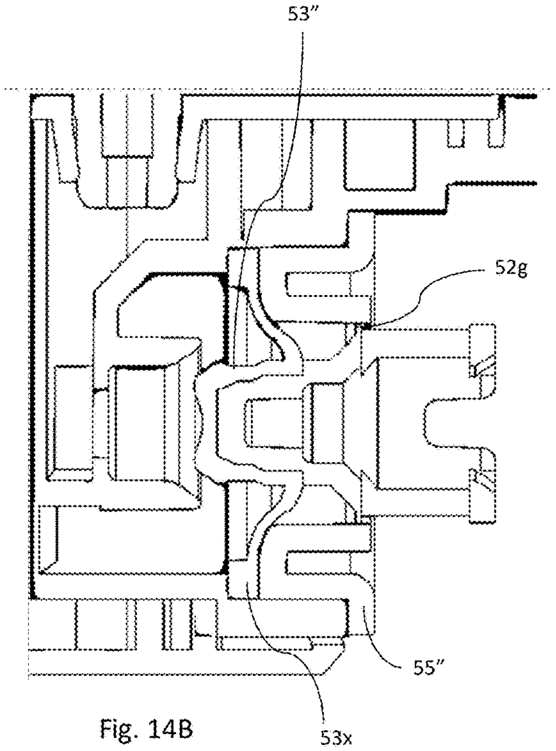

FIGS. 14A, 14B depict an alternative valve construction, which differs from the above example in that the sealing structure 53" has an integral sealing flange that is sealingly connected to an inner side of the PPU, the prevent product leakage. For example, an outer edge of the sealing flange 53*x* can be compressed between opposite wall sections of a mounting member 55" and a PPU wall section 99', providing a circumferential aseptic seal therebetween In FIG. 14A the valve is in a closed state, whereas FIG. 14B shows the valve in an product flow releasing state. The radial sealing flange 53*x* of the sealing structure 53" is preferably flexible, allowing axial displacement of the valve body between respective axial valve body positions. In this case, the sealing structure 53" is preferably not compressed within a valve body guiding space during operation. Still, the valve body can include a circumferential rim 52*g*, to be slidingly engaged (and guided) by the inner surface of the cylindrical internal wall 55*a* of the valve mounting member 55.

The second sealing structure 53 preferably includes a radially expanded circumferential rim 53*b* (e.g. abutting said rim 52*g* of the valve body 52) that is elastically compressed between the valve body 52 and the cylindrical internal wall 55*a* of the valve mounting member, preferably when the valve is in a closed state and also when the valve is in an opened state.

Operation of the resulting valve structure of FIG. 14 follows the above-described operation of the earlier example, wherein a distal part of a valve actuator of the dispensing machine B can engage the valve body to control the valve state, after placement of a respective product container H in the machine B.

It follows that the present embodiments can provide an reliable, durable aseptic valve, that can be part of or located inside the foaming unit PPU of the product container. Embodiments of the are designed to control entrance of product (e.g. via a primary seal, provided by a distal section of a said sealing structure 53) and preferably also to prevent leakage of product to an environment of the container H (secondary seal). In particular, the valve can acts like a piston, moving axially to open/close the entrance of product to the downstream foaming unit(s) of the PPU. During operation, when dosing of a certain amount of foamed product is desired, the valve actuator VA (e.g. an activator pin) can simply open the valve, when dosing is completed actuator VA can closes it. It is preferred that the actuator VA couples to the valve body once, after container placement, and only decouples in case the container H is to be removed from the dispensing machine B. According to an embodiment, a top 53*a* of the sealing structure (e.g. primary seal) can provides a hygienic radial seal during primary life and can prevent leakage to the valve chamber in a secondary life. A secondary seal section 53*b*, 53*x* of the sealing structure can prevent leakage to the environment.

Also, an advantage of using an axial movement to open/close the valve is that the system complexity is relatively low.

Besides, high product throughput can be achieved (wherein the system e.g. does not require mixing product with liquid such as water), and relatively high operating pressures can be achieved allowing good and swift product foaming.

Also, embodiments provide for allowing relatively large valve component tolerances and valve positioning tolerances, both during PPU assembly and during PPU operation.

While the invention has been explained using exemplary embodiments and drawings, these do not limit the scope of the invention in any way, said scope being provided by the claims. It will be appreciated that many variations, alternatives and extensions are possible within said scope, as will be clear to the skilled person from the description and the drawings.

Also, for example, in each embodiment, the CPU is preferably integrated with the respective product container H. Alternatively, the CPU and product container can be separate or separately delivered, to be joined for use in the dispensing machine B.

The invention claimed is:

1. A foamed product dispensing system, wherein the system comprises:

(i) a product dispensing machine, configured to receive an exchangeable product container;

(ii) a product container, configured to cooperate with the product dispensing machine, after placement in the machine;

wherein the product container is capable of comprising a foamable product, wherein the product container has a product processing unit (PPU) comprising at least one frothing device having a product entrance for receiving product and a product exit for discharging product, wherein the PPU is connectable to a gas supply for supplying gas to the product, wherein the PPU comprises a processing device arranged downstream of the frothing device and configured for performing a mixing treatment and/or pressure reduction treatment of the product provided with gas, wherein the PPU comprises a product feedthrough channel (PFC) upstream of the at least one frothing device, the PFC comprising a valve for controlling product flow towards the frothing device, the valve having a valve seat that is closable by distal section of a respective valve body, the distal section of the valve body carrying a first sealing structure, the valve seat having a substantially cylindrical inner wall for slidingly and sealingly engaging the first sealing structure at at least two different axial closing positions of the valve body with respect to the valve seat.

2. The dispensing system according to claim 1, wherein the at least two different axial closing positions are a first closing position and a second closing position that are spaced-apart from the first closing position by at least 1 mm.

3. The dispensing system according to claim 1, wherein the valve body is axially displaceable from the closing positions to a third axial position for removing its distal section from the substantially cylindrical inner wall of the valve seat, to allow product flow through the valve.

4. The dispensing system according to claim 1, wherein the first sealing structure has a radially expanded section that is elastically compressed by substantially cylindrical inner wall of the valve seat when the valve body is in a axial closing position.

5. The dispensing system according to claim 1, wherein the first sealing structure is configured for entirely closing a product flow channel part defined by the substantially cylindrical inner wall of the valve seat, when the valve body is in a the axial closing position, the first sealing structure in particular comprising a closed top section that axially covers the distal section of the valve body.

6. The dispensing system according to claim 1, wherein the valve seat includes a radially diverging proximal section optionally having an outer edge facing a radially expanded section of the valve body, the outer edge optionally facing an end stop surface of the radially expanded section of the valve body that is not covered by the first sealing structure.

7. The dispensing system according to claim 1, wherein a proximal section of the valve body extends through a valve body receiving space defined in a valve mounting member of the PPU, the valve mounting member being axially spaced-apart from the valve seat, and optionally being coaxial with respect to the valve seat.

8. The dispensing system according to claim 7, wherein the valve body carries a second sealing structure for sealingly engaging the valve mounting member optionally at any position of the valve body with respect to the valve seat, wherein the first sealing structure and second sealing structure, carried by the valve body, are optionally integrated with each other.

9. The dispensing system according to claim 7, wherein the valve mounting member has a cylindrical internal wall that defines a cylindrical valve body guiding space, the valve body optionally having a circumferential rim for slidingly engaging the cylindrical internal wall of the valve mounting member, wherein the second sealing structure optionally comprises a radially expanded rim that is elastically compressed between the valve body and the cylindrical internal wall of the valve mounting member.

10. The dispensing system according to claim 9, wherein a state of elastic compression of the rim of the second sealing structure depends on a valve body position with respect to the valve seat.

11. The dispensing system according to claim 1, wherein the valve body encloses an actuator engagement space for receiving a distal section of a valve actuator of the dispensing machine, wherein the valve body includes an internal locking structure allowing engagement of at least one actuator hook member of the distal section of the valve actuator, when positioned in the actuator engagement space, for axially moving the valve body away from the valve seat and vice-versa.

12. The dispensing system according to claim 1, wherein the valve body and the distal section of the valve actuator are configured to engage and disengage each other via a bayonet connection, after placement of the product container in the dispensing machine, optionally such that during operation the distal section of the valve actuator is axially movable into the valve body towards a first position, after which it is rotated to a second position in which the actuator can axially displace the valve body from the valve seat.

13. The dispensing system according to claim 1, wherein the valve body and each sealing structure are formed by two-component injection moulding.

14. The dispensing system according to claim 1, wherein the sealing structure is a an elastic plastic, an elastomer, a thermoplastic elastomer, silicone, PPE, l-PPE or LL-PPE.

15. The dispensing system according to claim 1, wherein the valve body is made of polypropylene, a polyarylether ketone PAEK, polyether ether ketone, a polyethylene terephthalate thermoplastic polymer, a polysulfone thermoplastic polymer, or a polyoxy methylene thermoplastic polymer.

16. The dispensing system according to claim 1, wherein the foamable product is a cream.

17. A method for dispensing a foamed product with the system according to claim 1, the method comprising:

(a) placing the product holder in the dispensing machine;

(b) pressurizing the content of the product holder, for example to a pressure of at least 5 bar;

(c) supplying pressurized gas to the processing unit (PPU) of the product holder, by the gas supply of the dispensing machine;

(d) supplying product to the processing unit (PPU) via the product feedthrough channel (PFC) upstream of the at least one frothing device by automatically opening the valve of the processing unit (PPU) by an actuator of the dispensing machine.

18. A foamed product dispensing system according to claim 1, wherein the system comprises:

(i) a product dispensing machine, configured to receive an exchangeable product container;

(ii) a product container, configured to cooperate with the product dispensing machine, after placement in the machine, wherein the product container contains a foamable product and has a product processing unit (PPU) comprising at least one frothing device having a product entrance for receiving product and a product exit for discharging product, wherein the processing unit (PPU) is connectable to a gas supply for supplying gas to the product, wherein the product processing unit (PPU) comprises a processing device arranged downstream of the frothing device and configured for performing a mixing treatment and/or pressure reduction treatment of the product provided with gas, wherein the product processing unit (PPU) comprises a product feedthrough channel (PFC) upstream of the at least one frothing device, the product feedthrough channel (PFC) comprising a valve for controlling product flow towards the frothing device, the valve having a valve seat that is closable by distal section of a respective valve body, the distal section of the valve body carrying a first sealing structure, the valve seat having a substantially cylindrical inner wall for slidingly and sealingly engaging the first sealing structure at least a first axial closing position of the valve body with respect to the valve seat, wherein a proximal section of the valve body extends through a valve body receiving space defined in a valve mounting member of the product processing unit (PPU), the valve mounting member in particular being axially spaced-apart from the valve seat, and optionally being coaxial with respect to the valve seat, wherein the valve body optionally carries a second sealing structure for sealingly engaging the valve mounting member at any position of the valve body with respect to the valve seat, wherein the first sealing structure and second sealing structure, carried by the valve body, are optionally integrated with each other.

19. A foamed product dispensing system according to claim 1, wherein the system comprises:

(i) a product dispensing machine, configured to receive an exchangeable product container;

(ii) a product container, configured to cooperate with the product dispensing machine, after placement in the machine, wherein the product container has a product processing unit (PPU) comprising at least one frothing device having a product entrance for receiving product and a product exit for discharging product, wherein the processing unit (PPU) is connectable to a gas supply for supplying gas to the product, wherein the product processing unit (PPU) comprises a processing device arranged downstream of the frothing device and configured for performing a mixing treatment and/or pressure reduction treatment of the product provided with gas, wherein the product processing unit (PPU) includes a product feedthrough channel (PFC) upstream of the at least one frothing device, the product feedthrough channel (PFC) comprising a valve for controlling product flow towards the frothing device, the valve having a valve seat that is closable by distal section of a respective valve body, the distal section of the valve body carrying a first sealing structure, the valve seat having a substantially cylindrical inner wall for slidingly and sealingly engaging the first sealing structure at least a first axial closing position of the valve body with respect to the valve seat, wherein the valve body encloses an actuator engagement space for receiving a distal section of a valve actuator (VA) of the dispensing machine, wherein the valve body includes an internal locking structure allowing engagement of at least one actuator hook member of the distal section of the valve actuator, when positioned in a valve engagement position the actuator engagement space, for axially moving the valve body away from the valve seat and vice-versa, optionally without rotating the valve body, wherein the valve body is also configured for receiving the distal section of the valve actuator (VA) first by axial movement of the distal section of the valve actuator (VA) into the valve body, after which the received distal section of the valve actuator (VA) can be rotated to the respective valve engagement position.

20. A product container, configured to cooperate with a product dispensing machine, after placement in the machine;

wherein the product container comprises a foamable product, wherein the product container has a product processing unit (PPU) comprising at least one frothing device having a product entrance for receiving product and a product exit for discharging product, wherein the PPU is connectable to a gas supply for supplying gas to the product, wherein the PPU comprises a processing device arranged downstream of the frothing device and configured for performing a mixing treatment and/or pressure reduction treatment of the product provided with gas, wherein the PPU comprises a product feedthrough channel (PFC) upstream of the at least one frothing device, the PFC comprising a valve for controlling product flow towards the frothing device, the valve having a valve seat that is closable by distal section of a respective valve body, the distal section of the valve body carrying a first sealing structure, the valve seat having a substantially cylindrical inner wall for slidingly and sealingly engaging the first sealing structure at at least two different axial closing positions of the valve body with respect to the valve seat.

* * * * *